Patented Mar. 15, 1938

2,111,306

UNITED STATES PATENT OFFICE 2,111,306

MINERAL OIL COMPOSITION AND PROCESS FOR TREATING SAME

Thomas W. Bartram, Nitro, W. Va., assignor, by mesne assignments, to Monsanto Chemical Company, St. Louis, Mo., a corporation of Delaware No Drawing. Application September 12, 1935, Serial No. 40,307

14 Claims. (Cl. 44—9)

This invention relates to improvement in means for the protection of liquid hydrocarbon products against the formation of insoluble and gummy products. More particularly the present invention relates to improved materials for use with liquid hydrocarbons which may be used as fuels.

Liquid hydrocarbons as commercially produced, particularly when prepared by the distillation or cracking of petroleum, possess a tendency on standing to form gums and resinous substances. Gasolines produced by the modern cracking processes are extremely complicated mixtures comprising many constituents, the character of these constituents and the relative proportions of the different constituents depending upon the source of the crude and the particular cracking process employed. Among other constituents, the crude cracked gasoline contains unsaturated hydrocarbons, such as for example olefines and diolefines. The more recent pressure methods of vapor phase cracking result in a considerably higher percentage of diolefines than the older methods. It has thus become necessary to treat the crude product resulting from the more recent cracking processes in some manner to remove the greater part of these more highly unsaturated products. Among these methods of treatment may be mentioned the sulfuric acid treatment and the fuller's earth vapor phase treatment. While these methods of purification have been heretofore largely employed, their use is open to many disadvantages, one of which is the expense involved.

This formation of gummy material in gasoline causes such undesirable effects, when used in internal combustion engines, as sticking of the valve stems and excessive carbon formation.

In accordance with this invention the development of these undesirable characteristics may be readily prevented or materially delayed without apparently increasing the cost of production thereof.

The present invention has for an object the inhibition of the formation of gums and resins in oil compositions.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactory stable mineral oil product be employed.

Another object is to provide a method and means of the character referred to that will not appreciably increase the cost of production of petroleum products.

Other objects of the invention will be apparent from the following description.

The class of materials which have been found to possess the desirable qualities set forth in that small proportions thereof when incorporated in a relatively unstable oil product, for example gasoline, materially increases the stability thereof, comprise sulfurized diaryl arylene diamines, or more particularly the reaction products obtainable by reacting a diaryl arylene diamine with sulfur or compounds containing readily reactive sulfur.

Illustrative of the class of diaryl arylene diamines from which sulfurized compounds may be prepared and employed as stabilizers for unstable mineral oil products, for example gasoline, are diphenyl-p-phenylene diamine, diphenyl-m-phenylene diamine, diphenyl-o-phenylene diamine, di para tolyl-p-phenylene diamine, di beta naphthyl-p-phenylene diamine, di alpha naphthyl-p-phenylene diamine, aryl substituted naphthylene diamines such as 1.4 dianilino naphthalene, sym. diphenyl benzidine and analogues and equivalents thereof. The diaryl arylene diamines of the present invention preferably possess the formula of

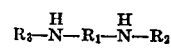

where $R_1$ is an arylene radical as phenylene, naphthylene and the like and $R_2$ and $R_3$ are aromatic radicals.

In order to test the gum inhibiting properties of the preferred class of materials, the following procedure which is essentially that described by Egloff, Morrell, Lowry and Dryer in Industrial and Engineering Chemistry, vol. 24, pages 1375 to 1382 (1932) was employed.

Into a suitably sized bomb of the type described in the above article, there was placed an 8 ounce oil sample bottle containing 200 c. c. of an unstable gasoline, as for example vapor phase cracked gasoline to which was added 20 mgs. of one of the inhibitors of the invention. The lid was then placed tightly on the bomb. Substantially one hundred pounds pressure of oxygen was introduced into the bomb by means of a suitable valve. The bomb was then connected, by means of a delivery tube, with a recording pressure gauge, after which it was heated in a steam bath until a sharp drop in the pressure curve indicated an end of the period of stability of the unstable fuel, and a rapid reaction of the oxygen with certain unsaturated compounds in the gasoline. This period of stability is frequently called the induction period.

As one specific embodiment of the present invention, 26 parts by weight of diphenyl-p-phenylene diamine (substantially 0.1 mol.) and 12 parts by weight of sulfur (substantially 0.4 atomic weight portion) were heated in the presence of a suitable catalyst or condensing agent, for example iodine, at the fusion temperature of the mixture. After extracting the reaction product with a convenient solvent, as for example acetone, and separating the solvent from the extract, the product so produced was found on testing in the manner described above to possess an induction period of 450 minutes as compared to the induction period of 60 minutes for the untreated gasoline.

Di alpha naphthyl-p-phenylene diamine has also been reacted with sulfur, preferably in the ratio of substantially one molecular proportion of di-alpha naphthyl-p-phenylene diamine and substantially four atomic weight portions of sulfur, by heating said reactants at a temperature of substantially 200° to 220° C. in the presence of a condensation agent as for example iodine. The product obtained by this sulfurization process was found on testing in a vapor phase cracked gasoline to possess the desirable gum inhibiting properties typical of the preferred class of materials.

Other methods of preparing the new class of compounds may be employed. Thus, the diaryl arylene diamine may be dissolved or suspended in a suitable high boiling solvent, for example xylene, and reacted with sulfur in the presence of a suitable catalyst, for example iodine. Thus, substantially one molecular proportion of diphenyl-p-phenylene diamine and an excess over four molecular proportions of sulfur were heated in the presence of a solvent, as for example xylene, at refluxing temperature in the presence of a catalyst, as for example iodine, and the reaction product obtained on testing 20 mgs. thereof in 200 c. c. of a vapor phase cracked gasoline in the manner described above was found to possess an induction period of 405 minutes as compared to an induction period of 60 minutes for the same untreated gasoline. The reaction product described above after purification was found to contain 11.05% sulfur, which corresponds to a ratio of one atom of sulfur to two atoms of nitrogen in the diaryl arylene diamine.

As a further test showing the gum inhibiting properties of the preferred class of compounds, a copper dish test was carried out in the well-known manner on a vapor phase cracked gasoline containing the preferred gum inhibitors and on the same untreated gasoline. Thus, as one such test, 10 mgs. of the reaction product obtained by heating substantially one molecular proportion of diphenyl-p-phenylene diamine with substantially four atomic weight portions of sulfur in the presence of an inert organic solvent as described above, was incorporated in 100 c. c. of a vapor phase cracked gasoline, the solution placed in a copper dish and the liquid evaporated therefrom on a steam bath. The gum formed was 0.0165 gram. A similar test carried out on the untreated gasoline produced 0.5327 gram of gum.

Sulfurized diaryl arylene diamines have been prepared by reacting different proportions of amine and sulfur or the sulfur containing compound than that described above. Thus, a diaryl arylene diamine, for example diphenyl-p-phenylene diamine, has been reacted with sulfur in the ratio of substantially two molecular proportions of a sulfurizing agent, for example sulfur. Furthermore, sulfur chloride, for example sulfur dichloride, has been reacted with diaryl arylene diamines in varying proportions, and the product so formed employed as inhibitors of gum formation according to the present invention.

As further specific examples showing the use of the preferred class of materials, the following compounds have been prepared and employed in an unstable vapor phase cracked gasoline in the manner indicated above. (A)—reaction product of substantially one molecular proportion of di beta naphthyl-p-phenylene diamine and substantially four atomic weight portions of sulfur; (B)—reaction product of substantially one molecular proportion of di-p-tolyl-p-phenylene diamine and substantially four atomic weight portions of sulfur; (C)—reaction product of substantially two molecular proportions of di beta naphthyl-p-phenylene diamine and substantially one molecular proportion of sulfur dichloride; (D)—reaction product of substantially equi-molecular proportions of diphenyl-p-phenylene diamine and sulfur dichloride; (E)—reaction product of substantially two molecular proportions of di-p-tolyl-p-phenylene diamine and substantially one molecular proportion of sulfur dichloride; (F)—reaction product obtained by heating substantially one molecular proportion of diphenyl-p-phenylene diamine and substantially two atomic weight portions of sulfur at a temperature of substantially 180° to 200° C.

Gum inhibitors designated as (A) and (B) above were prepared by heating the reactants in the presence of a solvent in a manner analogous to that described above for the reaction between sulfur and diphenyl-p-phenylene diamine. Gum inhibitors designated as (C), (D) and (E) above were prepared preferably by carrying out the reaction in the presence of an inert solvent at a temperature below room temperature, preferably at 0° to 5° C.

The test results follow:

| Gum inhibitor | Wt. of gum inhibitor added mg. | C. C. of vapor phase cracked gasoline | Induction period in minutes |
| --- | --- | --- | --- |
| A | 20 | 200 | 205 |
| B | 20 | 200 | 525 |
| C | 20 | 200 | 230 |
| D | 20 | 200 | 130 |
| E | 20 | 200 | 360 |
| F | 20 | 200 | 390 |
| None |  | 200 | 60 |

From the data hereinbefore set forth it is shown that sulfurized diaryl arylene diamines comprise an important class of stabilizers of mineral oil products, for example unstable cracked gasoline.

If convenient or desirable, if the inhibitor to be added to the unstable oil product, for example gasoline, is not readily soluble therein, it may be dissolved in a suitable solvent and the solution of the inhibitor thus prepared added thereto.

Other similar oil compositions designed for particular uses may be prepared in the manner described by substituting the desired oil fraction or cut and adding the necessary quantity of the gum inhibitor thereto. To produce the effect desired, a quantity of inhibitor equal to from 0.001 to 0.05% of the weight of the oil product is preferably employed.

Other ratios of the preferred class of materials than those hereinbefore set forth have been incorporated in an unstable oil product, for example gasoline.

The present invention is limited solely by the claims attached hereto as part of the present invention.

What is claimed is:

1. A cracked hydrocarbon motor fuel of the type which tends to deteriorate on storage as evidenced by color and gum formation containing is a stabilizer thereof a small proportion of a sulfurized diaryl arylene diamine obtainable by heating under reacting conditions substantially one molecular proportion of a diaryl arylene diamine and at least two atomic weight equivalents of sulfur in the presence of a condensation agent.

2. A cracked hydrocarbon motor fuel of the type which tends to deteriorate on storage as evidenced by color and gum formation containing as a stabilizer thereof a small proportion of a sulfurized diaryl phenylene diamine obtainable by heating under reacting conditions substantially one molecular proportion of a diaryl phenylene diamine and at least two atomic weight equivalents of sulfur in the presence of a condensation agent.

3. A cracked hydrocarbon motor fuel of the type which tends to deteriorate on storage as evidenced by color and gum formation containing as a stabilizer thereof a small proportion of a sulfurized diphenyl phenylene diamine obtainable by heating under reacting conditions substantially one molecular proportion of diphenyl phenylene diamine and at least two atomic weight equivalents of sulfur in the presence of a condensation agent.

4. A cracked hydrocarbon motor fuel of the type which tends to deteriorate on storage as evidenced by color and gum formation containing as a stabilizer thereof a small proportion of a sulfurized diphenyl-p-phenylene diamine obtainable by heating under reacting conditions substantially one molecular proportion of diphenyl-p-phenylene diamine and at least two atomic weight equivalents of sulfur in the presence of a condensation agent.

5. A cracked hydrocarbon motor fuel of the type which tends to deteriorate on storage as evidenced by color and gum formation containing as a stabilizer thereof a small proportion of a sulfurized diphenyl-p-phenylene diamine obtainable by heating under reacting conditions substantially one molecular proportion of diphenyl-p-phenylene diamine with substantially four atomic weight equivalents of sulfur in the presence of a condensation agent.

6. A cracked hydrocarbon motor fuel of the type which tends to deteriorate on storage as evidenced by color and gum formation containing as a stabilizer thereof a small proportion of a sulfurized di beta naphthyl-p-phenylene diamine obtainable by heating under reacting conditions substantially one molecular proportion of di beta naphthyl-p-phenylene diamine with substantially four atomic weight equivalents of sulfur in the presence of a condensation agent.

7. A cracked gasoline containing as a stabilizer thereof a small proportion of a sulfurized diaryl arylene diamine obtainable by heating under reacting conditions substantially one molecular proportion of a diaryl arylene diamine and at least two atomic weight equivalents of sulfur in the presence of a condensation agent.

8. A cracked gasoline containing as a stabilizer thereof a small proportion of a sulfurized diaryl phenylene diamine obtainable by heating under reacting conditions substantially one molecular proportion of a diaryl phenylene diamine and at least two atomic weight equivalents of sulfur in the presence of a condensation agent.

9. A cracked gasoline containing as a stabilizer thereof a small proportion of a sulfurized diphenyl-p-phenylene diamine obtainable by heating under reacting conditions substantially one molecular proportion of diphenyl-p-phenylene diamine and at least two atomic weight equivalents of sulfur in the presence of a condensation agent.

10. A cracked gasoline containing as a stabilizer thereof a small proportion of a sulfurized diphenyl-p-phenylene diamine obtainable by heating under reacting conditions substantially one molecular proportion of diphenyl-p-phenylene diamine with substantially four atomic weight equivalents of sulfur in the presence of a condensation agent.

11. A cracked gasoline containing as a stabilizer thereof a small proportion of a sulfurized di beta naphthyl-p-phenylene diamine obtainable by heating under reacting conditions substantially one molecular proportion of di beta naphthyl-p-phenylene diamine with substantially four atomic weight equivalents of sulfur in the presence of a condensation agent.

12. A cracked hydrocarbon motor fuel of the type which tends to deteriorate on storage as evidenced by color and gum formation containing as a stabilizer thereof a small proportion of a sulfurized diaryl arylene diamine containing sulfur and nitrogen in the ratio of one atom of sulfur to two atoms of nitrogen and obtainable by heating under reacting conditions substantially one molecular proportion of a diaryl arylene diamine and at least two atomic weight equivalents of sulfur in the presence of a condensation catalyst.

13. A cracked gasoline containing as a stabilizer thereof a small proportion of a sulfurized diaryl arylene diamine containing sulfur and nitrogen in the ratio of one atom of sulfur to two atoms of nitrogen and obtainable by heating under reacting conditions substantially one molecular proportion of a diaryl arylene diamine and at least two atomic weight equivalents of sulfur in the presence of a condensation catalyst.

14. A cracked gasoline containing as a stabilizer thereof a small proportion of a sulfurized diphenyl-p-phenylene diamine containing sulfur and nitrogen in the ratio of one atom of sulfur to two atoms of nitrogen and obtainable by heating under reacting conditions substantially one molecular proportion of diphenyl-p-phenylene diamine and at least two atomic weight equivalents of sulfur in the presence of a condensation agent.

THOMAS W. BARTRAM.